(12) United States Patent
Hsuan

(10) Patent No.: US 7,039,248 B2
(45) Date of Patent: May 2, 2006

(54) METHOD FOR TRANSFORMING VIDEO DATA BY WAVELET TRANSFORM SIGNAL PROCESSING

(75) Inventor: Chih-Lin Hsuan, Taipei (TW)

(73) Assignee: Institute for Information Industry, Taipei (TW)

( * ) Notice: Subject to any disclaimer, the term of this patent is extended or adjusted under 35 U.S.C. 154(b) by 605 days.

(21) Appl. No.: 10/071,178

(22) Filed: Feb. 7, 2002

(65) Prior Publication Data

US 2003/0103678 A1 Jun. 5, 2003

(30) Foreign Application Priority Data

Nov. 30, 2001 (TW) .............................. 90129697 A

(51) Int. Cl.
*G06K 9/36* (2006.01)
(52) U.S. Cl. ...................... 382/240; 382/248; 382/278; 382/282
(58) Field of Classification Search ................ 382/240, 382/252, 233, 248, 239, 264, 244, 251, 282, 382/263, 250, 278, 305, 128, 132; 375/240.12, 375/240.18, 240.2, 240.24; 600/408; 324/307, 324/323; 702/2; 378/39, 98.7, 37; 358/1.9; 348/452
See application file for complete search history.

(56) References Cited

U.S. PATENT DOCUMENTS

| | | | | |
|---|---|---|---|---|
| 4,239,971 A * | 12/1980 | Cushman | ..................... | 378/39 |
| 5,225,907 A * | 7/1993 | Casavant et al. | ........... | 348/452 |
| 5,402,463 A * | 3/1995 | Umetani et al. | ........... | 378/98.7 |
| 5,513,273 A * | 4/1996 | Ito | .............................. | 382/132 |
| 5,673,191 A * | 9/1997 | Chapin et al. | .................. | 702/2 |
| 6,075,878 A * | 6/2000 | Yoshida et al. | ............. | 382/132 |
| 6,246,742 B1 * | 6/2001 | Besson et al. | .................. | 378/8 |
| 6,310,967 B1 * | 10/2001 | Heine et al. | ................. | 382/128 |
| 6,333,991 B1 * | 12/2001 | Schreiber et al. | ........... | 382/132 |
| 6,389,169 B1 * | 5/2002 | Stark et al. | .................. | 382/225 |
| 6,480,300 B1 * | 11/2002 | Aoyama | ...................... | 358/1.9 |
| 6,603,885 B1 * | 8/2003 | Enomoto | ..................... | 382/263 |
| 6,678,420 B1 * | 1/2004 | Takeo et al. | ................. | 382/240 |
| 6,757,437 B1 * | 6/2004 | Keith et al. | .................. | 382/240 |
| 6,766,044 B1 * | 7/2004 | Tsujii | .......................... | 382/132 |
| 6,771,793 B1 * | 8/2004 | Yamada | ....................... | 382/264 |
| 6,775,412 B1 * | 8/2004 | Nister et al. | ................. | 382/243 |
| 6,807,550 B1 * | 10/2004 | Li et al. | ...................... | 707/201 |
| 6,882,755 B1 * | 4/2005 | Silverstein et al. | ......... | 382/282 |

(Continued)

OTHER PUBLICATIONS

Mareboyana et al., "Web Based Progressive Transmission for Browsing Remotely Sensed Imagery", IEEE, vol. 2, Jul. 2000, pps. 591-593.*

*Primary Examiner*—Anh Hong Do
(74) *Attorney, Agent, or Firm*—Thomas, Kayden, Horstemeyer & Risley

(57) ABSTRACT

A method to transform video data having an interest region by wavelet transform signal processing. First, the video data is transformed to high frequency image data and low frequency image data. Then, first image data recording first information responding to the interest region of the video data and second image data recording second information responding to the interest region of the video data from the high frequency image data are received. The first image data and the low frequency image data are combined to form interest region data. The interest region data and the second image data are combined by bit plane coding to generate display data. Finally, a display device displays the display data.

4 Claims, 11 Drawing Sheets

U.S. PATENT DOCUMENTS 6,898,323 B1 * 5/2005 Schwartz et al. ............ 382/240
6,898,325 B1 * 5/2005 Gormish ...................... 382/248
6,904,178 B1 * 6/2005 Boliek et al. ................ 382/251
6,925,209 B1 * 8/2005 Boliek et al. ................ 382/239
6,973,217 B1 * 12/2005 Boliek et al. ................ 382/251
6,983,075 B1 * 1/2006 Schwartz et al. ............ 382/251

* cited by examiner

METHOD FOR TRANSFORMING VIDEO DATA BY WAVELET TRANSFORM SIGNAL PROCESSING

BACKGROUND OF THE INVENTION

1. Field of the Invention

The present invention relates in general to a method for transforming video data comprising an interest region by wavelet transform signal processing. In particular, the present invention relates to a method for controlling the difference between the region of interest (ROI) and the region of no interest (non-ROI) of a video surveillance data by wavelet transform signal processing.

2. Description of the Related Art

Video surveillance is used to monitor images of a specific region. The conventional process to transform the video surveillance data is described as follows. First, an original image is analyzed to generate spectrums with different frequency, and then the information in the region of interest (ROI) and the region of no interest (non-ROI) in each spectrum is obtained. The region of interest (ROI) is defined according to the parameters of the video surveillance system, for example, the moving objects in the original image, the objects with predetermined temperature, and objects with predetermined shapes, all relating to the monitored targets.

FIG. 1 shows an original image 10 caught by the video surveillance system. The region 12 is the region of interest (ROI). The original image is analyzed to generate spectrums with different frequency. Then, the coordinate of the ROI is calculated according to the location of the ROI in the original image. FIG. 2 is a diagram of the original image 10 transformed by the wavelet transform signal processing. In FIG. 2, each block (20~129) has an independent frequency band, and the frequency of the frequency band is decreased in order from block 20 to block 29. The oblique lines in the blocks (20~29) represent the information of the ROI in the original image 10. In the spectrums transformed by wavelet transform signal processing, the lower frequency information represents the indistinct images in the original image 10, which records the contour of the original image 10, and the higher frequency information represents the tiny images in the original image 10, which are the shadow or the spots in the original image 10.

After the wavelets transform signal processing, the data is transformed by bit plane coding. FIG. 3A shows the original bit plane of the image. There are two regions in the original bit plane, one is the ROI of the bit plane, and the other is the region of the non-ROI bit plane. In FIG. 3B, the bit plane coding raises the resolution of the ROI region to emphasize the image of ROI. The data in the non-ROI region with little significance is recorded with few resources or abandoned. The bit plane coding is used to decrease the data volume of the image data. Therefore, the monitored image will be clearer in the same hardware equipment. Afterward, the image data is encoded to a specific form as JPEG2000 for example to record.

However, in wavelets transform signal processing, if the region of interest is too large or the bit rate is too slow, the non-ROI region of the image will disappear and deteriorates the display of the image as shown in FIG. 4.

SUMMARY OF THE INVENTION

The present invention provides a method for transforming video data comprising an interest region by wavelet transform signal processing, which makes the non-ROI region have a expected resolution after the bit plane coding.

To achieve the above-mentioned object, the present invention provides a method to transform video data having an interest region by wavelet transform signal processing. First, the video data is transformed to high frequency image data and low frequency image data. Then, first image data recording first information responding to the interest region of the video data and second image data recording second information responding to the interest region of the video data from the high frequency image data are received. The first image data and the low frequency image data are combined to form interest region data. The interest region data and the second image data are combined by bit plane coding to generate display data. Finally, a display device displays the display data.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE PREFERRED EMBODIMENT

Figure 1:
FIG. 1 shows an original image 10 caught by the video surveillance system.
Figure 2:
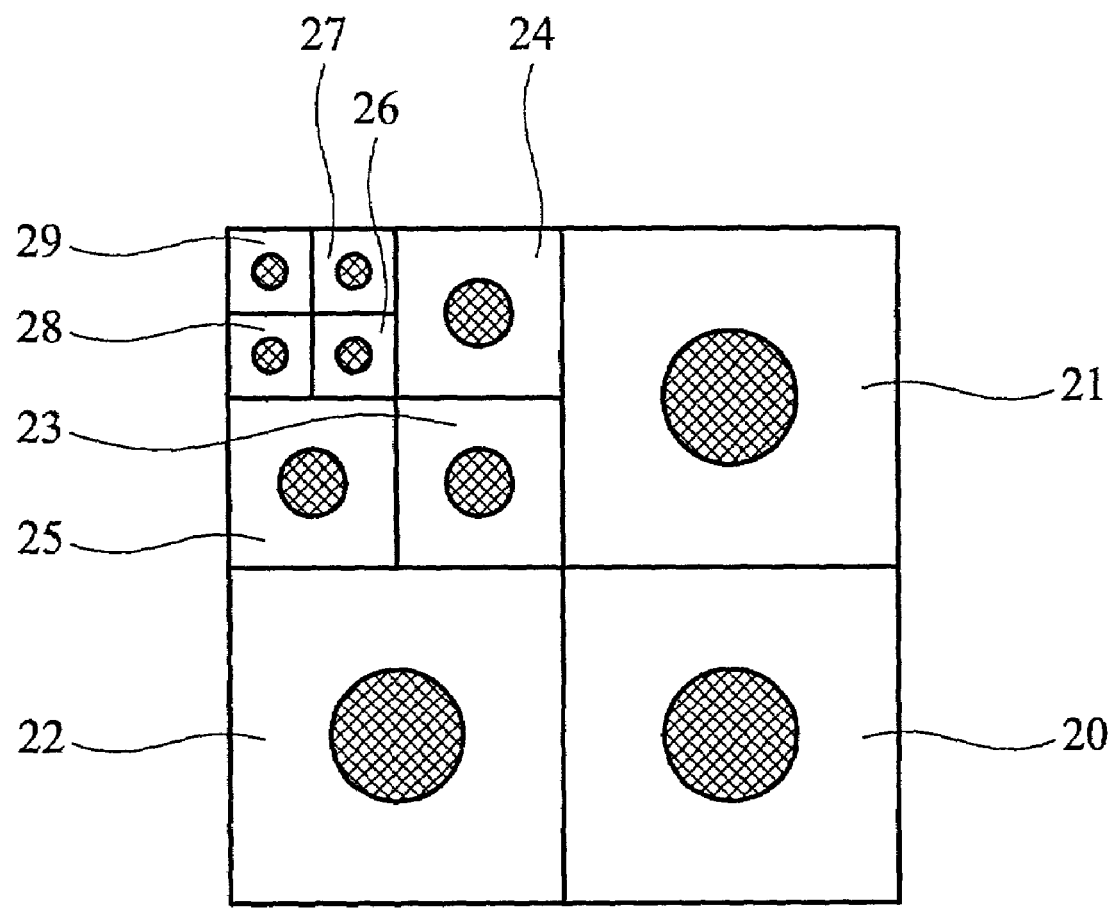
FIG. 2 is a diagram of the original image 10 transformed by the conventional wavelet transform signal processing.
Figure 3A:
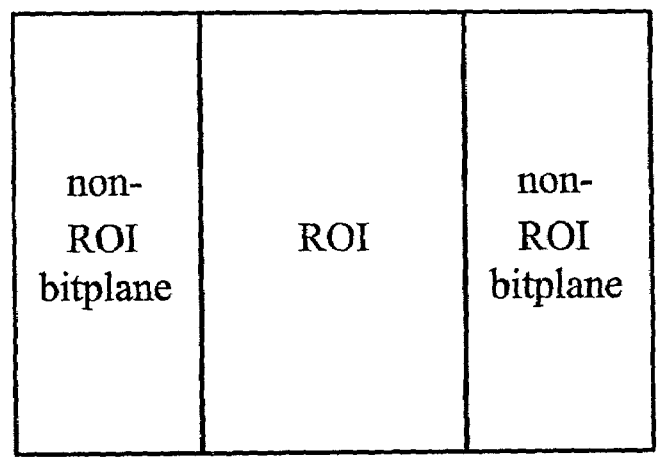
FIG. 3A shows the original bit plane of the image.
Figure 3B:
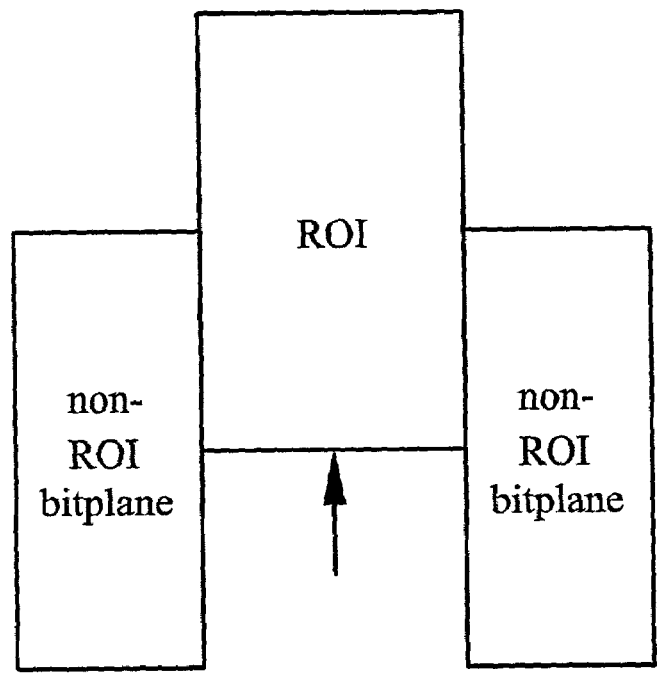
FIG. 3B illustrates the raising of the resolution of the bit plane coding.
Figure 4:
FIG. 4 shows the output image transformed by the convertional method.
Figure 5A:
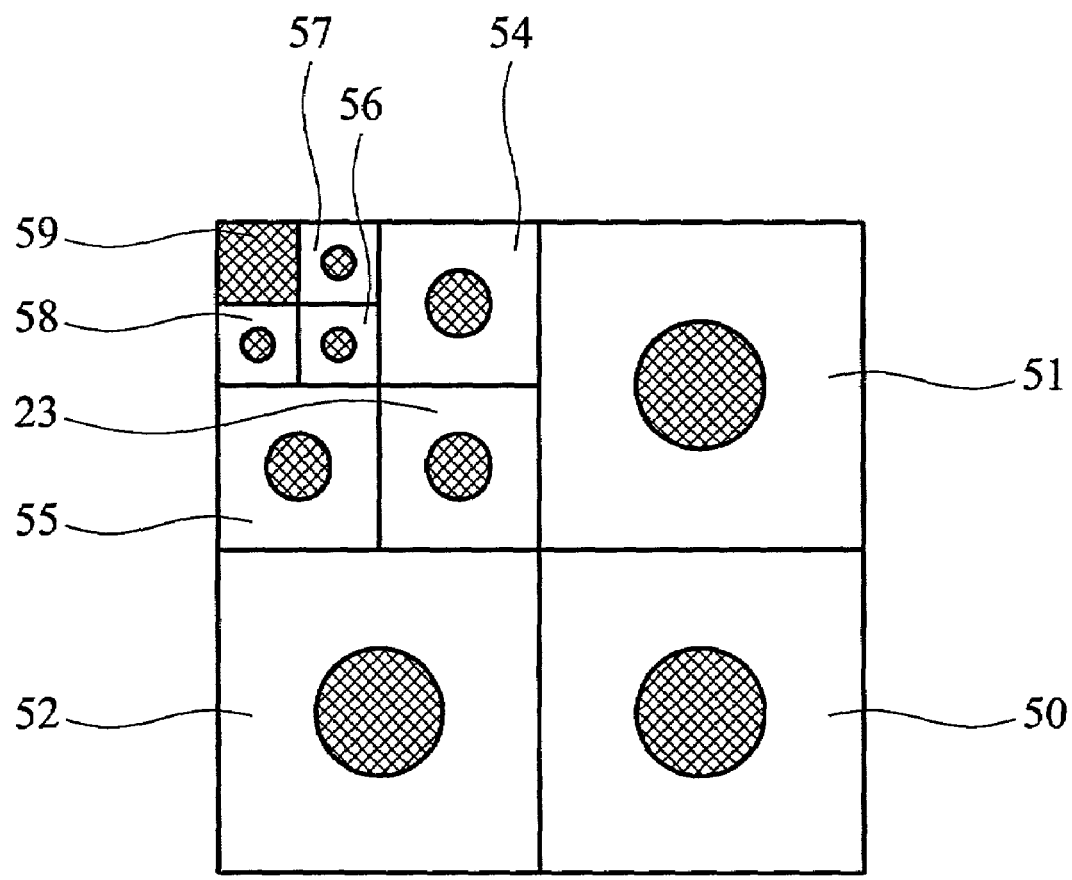
FIG. 5A is a diagram of the original image 10 transformed by the wavelet transform signal processing according to the embodiment of the present invention.

FIG. 1 shows an original image 10 caught by the video surveillance system. The region 12 is the region of interest (ROI). The original image is analyzed to generate spectrums with different frequency. Then, the coordinate of the ROI is calculated according to the location of the ROI in the original image. FIG. 5A is a diagram of the original image 10 transformed by the wavelet transform signal processing according to the embodiment of the present invention. In FIG. 5A, each block (50~59) has an independent frequency band, and the frequency of the frequency band is decreased in order from block 50 to block 59. The oblique lines in the blocks (50~59) represent the information of the ROI in the original image 10.

In the present embodiment, the block 59 records the data with the lowest frequency signal. The difference between the present invention and the prior art is that the block 59 in the present invention is set as the ROI region to solve the non-ROI region of the image disappearing and the deteriorating image. As mentioned above, in the spectrums transformed by wavelet transform signal processing, the lower frequency information represents the indistinct images in the original image 10, which records the contour of the original image 10. To solve the non-ROI region of the image disappearing in the prior art and consider the limitation of the transmitted data size, the present invention sets all the frequency band with lower frequency as the ROI region. Therefore, the output non-ROI region of the orignal image at least has dim contours, but does not disappear. Moveover, the degree of the resolution is based on the level of the wavelet transform signal processing.

After the wavelets transform signal processing, the data is transformed by bit plane coding. The bit plane coding raises the resolution of the ROI region to emphasize the image of ROI. The data in the non-ROI region with little significance is recorded with few resources or abandoned. The bit plane coding is used to decrease the data volume of the image data. Therefore, the monitored image will be clearer in the same hardware equipment.

Figure 5B:
FIG. 5B shows the output image transformed by the method according to the embodiment of the present invention.

Finally, the image data is encoded to a specific form as JPEG2000 for example to record or output to a display. FIG. 5B shows the output image transformed by the method according to the embodiment of the present invention. In FIG. 5B, the non-ROI region of the output video surveillance image has dim contours, which is close to the original image. Therefore, the vision effect of the image is improved.

The results according to the present invention by using different levels of the wavelet transform signal processing are shown as follows.

Figure 6A:
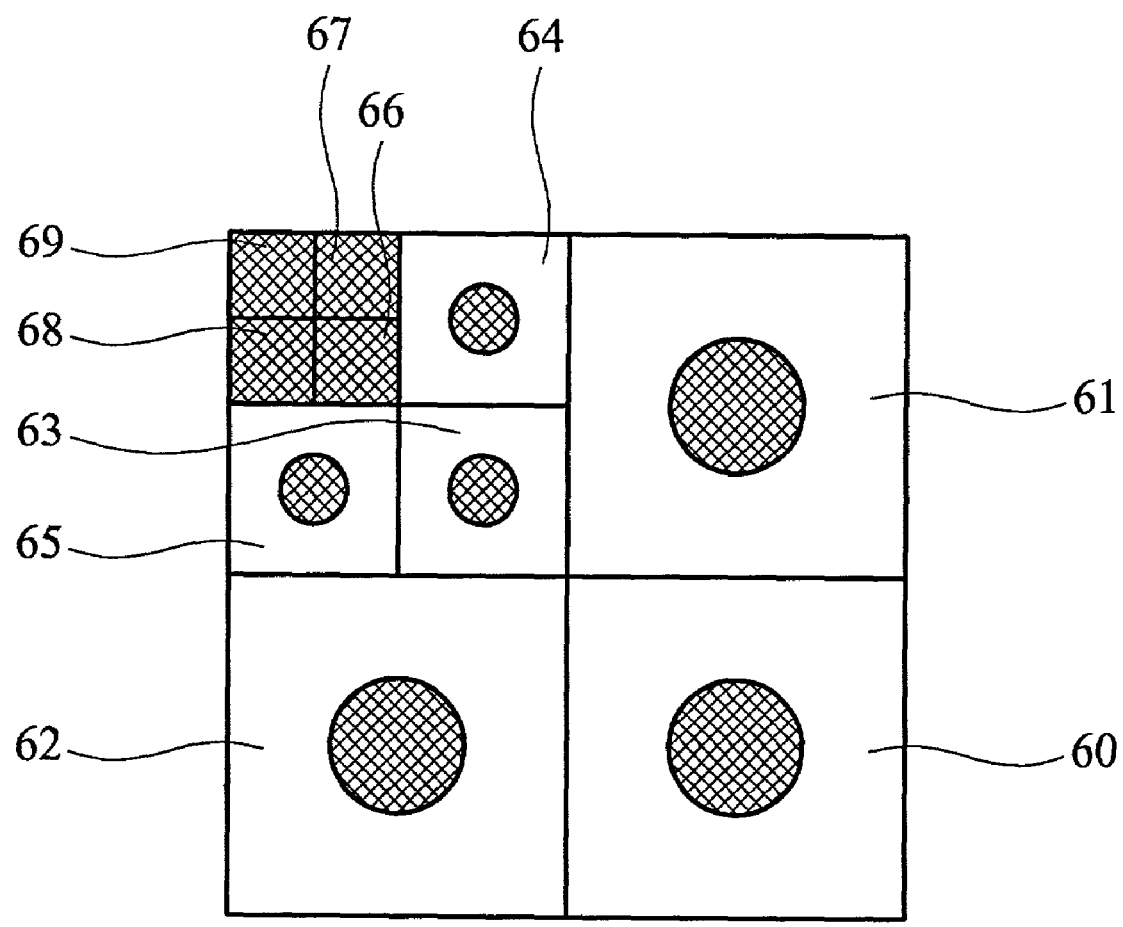
FIG. 6A is another diagram of the original image 10 transformed by the wavelet transform signal processing according to the embodiment of the present invention.

FIG. 6A is another diagram of the original image 10 transformed by the wavelet transform signal processing according to the embodiment of the present invention. In FIG. 6A, each block (60~69) has an independent frequency band, and the frequency of the frequency band is decreased in order from block 60 to block 69. The oblique lines in the blocks (60~65) represent the information of the ROI in the original image 10.

Figure 6B:
FIG. 6B shows another output image transformed by the method according to the embodiment of the present invention.

In this example, the block 66~69 are all set as the ROI region. After the bit plane coding, the output image is shown in FIG. 6B.

Figure 7A:
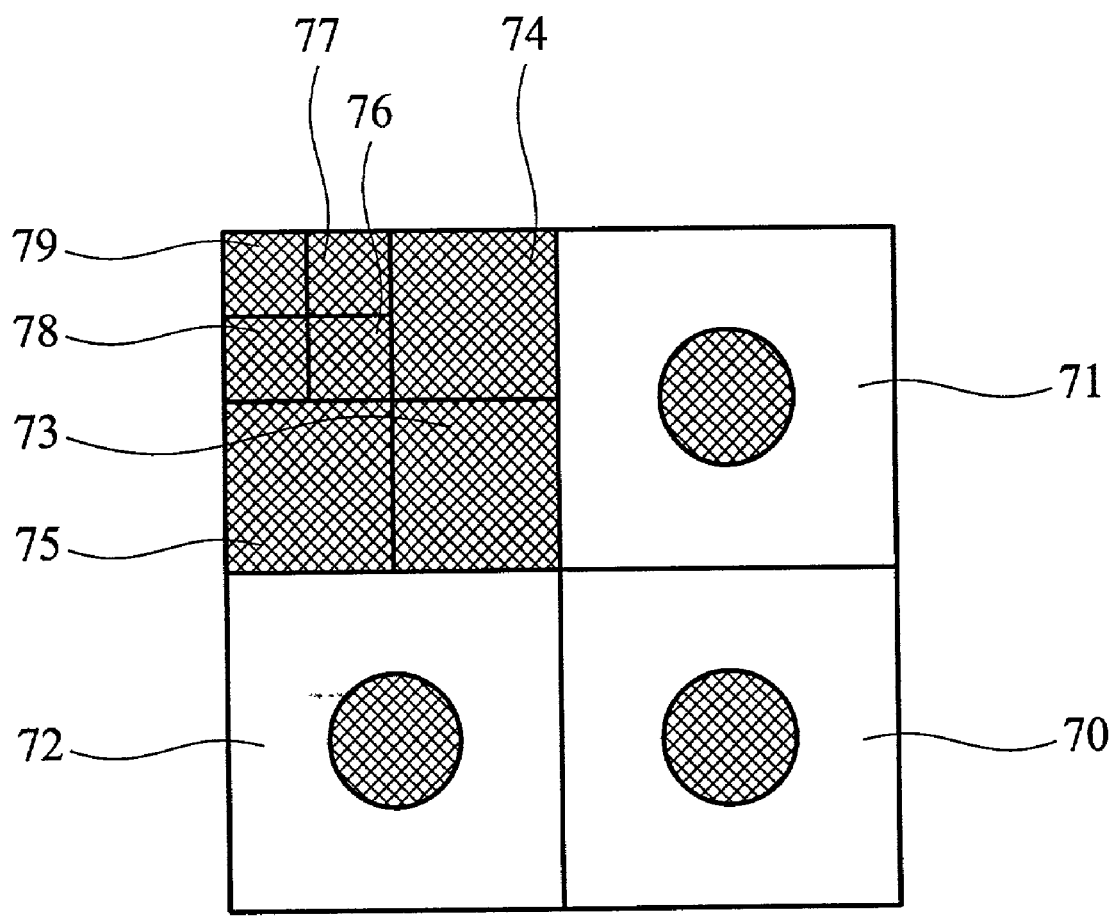
FIG. 7A is an another diagram of the original image 10 transformed by the wavelet transform signal processing according to the embodiment of the present invention.

FIG. 7A is an another diagram of the original image 10 transformed by the wavelet transform signal processing according to the embodiment of the present invention. In FIG. 7A, each block (70~79) has an independent frequency band, and the frequency of the frequency band is decreased in order from block 70 to block 79. The oblique lines in the blocks (70~72) represent the information of the ROI in the original image 10.

Figure 7B:
FIG. 7B shows the another output image transformed by the method according to the embodiment of the present invention.

In this example, the block 73~79 are all set as the ROI region. After the bit plane coding, the output image is shown in FIG. 7B.

Compared with the FIGS. 5B~7B, the contour of the non-ROI region of the output video surveillance image is clearer and closer to the original image. Since the image information recording the non-ROI region is increased, the vision effect of the output image is improved.

Because the level of the wavelet transform signal processing is set up based on the image transmitting rate and the hardware requirement, the resolution of the non-ROI region of the output image still depends on the image transmitting rate and the hardware requirement. However, the invention ensures that the image in the non-ROI region of the original image is not blank as in the prior art.

Figure 8:
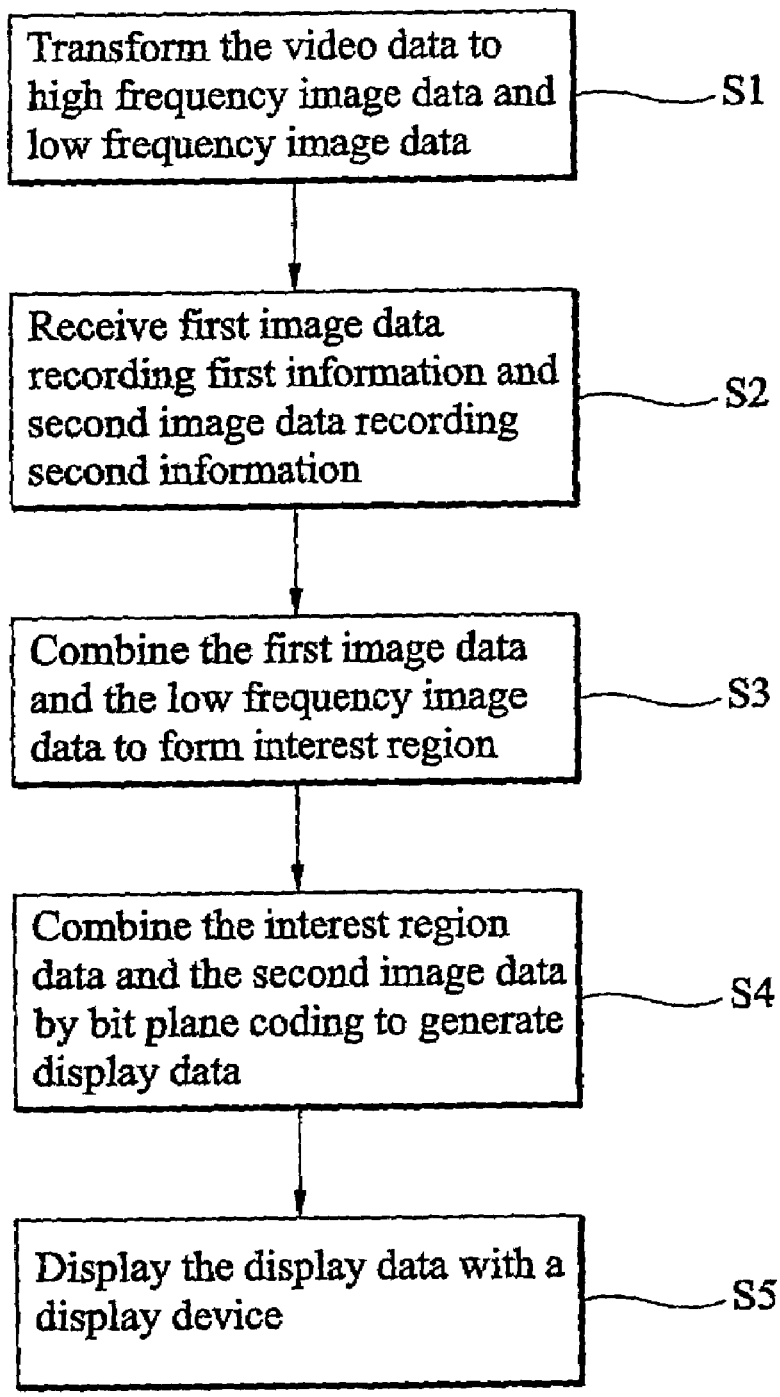
FIG. 8 is a flowchart illustrating the top-level operation of an embodiment of the present invention.

Reference is now made to FIG. 8, which is a flowchart illustrating the top-level operation of an embodiment of the present invention. Illustrated is a method for transforming video data comprising an interest region by wavelet transform signal processing. The method comprising transforming the video data to high frequency image data and low frequency image data (S1), getting first image data recording first information responding to the interest region of the video data and second image data recording second information responding to the interest region of the video data from the high frequency image data (S2), combining the first image data and the low frequency image data to form interest region data (S3), combining the interest region data and the second data by bit plane coding to generate display data (S4), and displaying the display data with a display device (S5).

In one embodiment, the high frequency image data and the low frequency image data have predetermined frequency bands. In one embodiment, the method further comprises compressing the display data. In one embodiment, such compression compresses the data into a compression form in accordance with JPEG2000.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for transforming video data comprising an interest region by wavelet transform signal processing, comprising the following steps:

transforming the video data to high frequency image data and low frequency image data;

getting first image data recording first information responding to the interest region of the video data and second image data recording second information responding to the interest region of the video data from the high frequency image data;

setting low frequency image data as first interest region data;

combining the first image data and the first interest region data to form second interest region data;

combining the second interest region data and the second image data by bit plane coding to generate display data; and displaying the display data with a display device.

2. The method as claimed in claim 1, wherein the high frequency image data and the low frequency image data have predetermined frequency bands.

3. The method as claimed in claim 2, further comprising the step of compressing the display data.

4. The method as claimed in claim 3, wherein the compression form of the display data is JPEG2000.

* * * * *